F. AESCHBACH.
MIXING AND KNEADING MACHINE.
APPLICATION FILED APR. 14, 1919.

1,336,878.

Patented Apr. 13, 1920.
3 SHEETS—SHEET 1.

Inventor:
Friedrich Aeschbach,
By Henry Orth Jr.
Atty.

F. AESCHBACH.
MIXING AND KNEADING MACHINE.
APPLICATION FILED APR. 14, 1919.
1,336,878.
Patented Apr. 13, 1920.
3 SHEETS—SHEET 2.
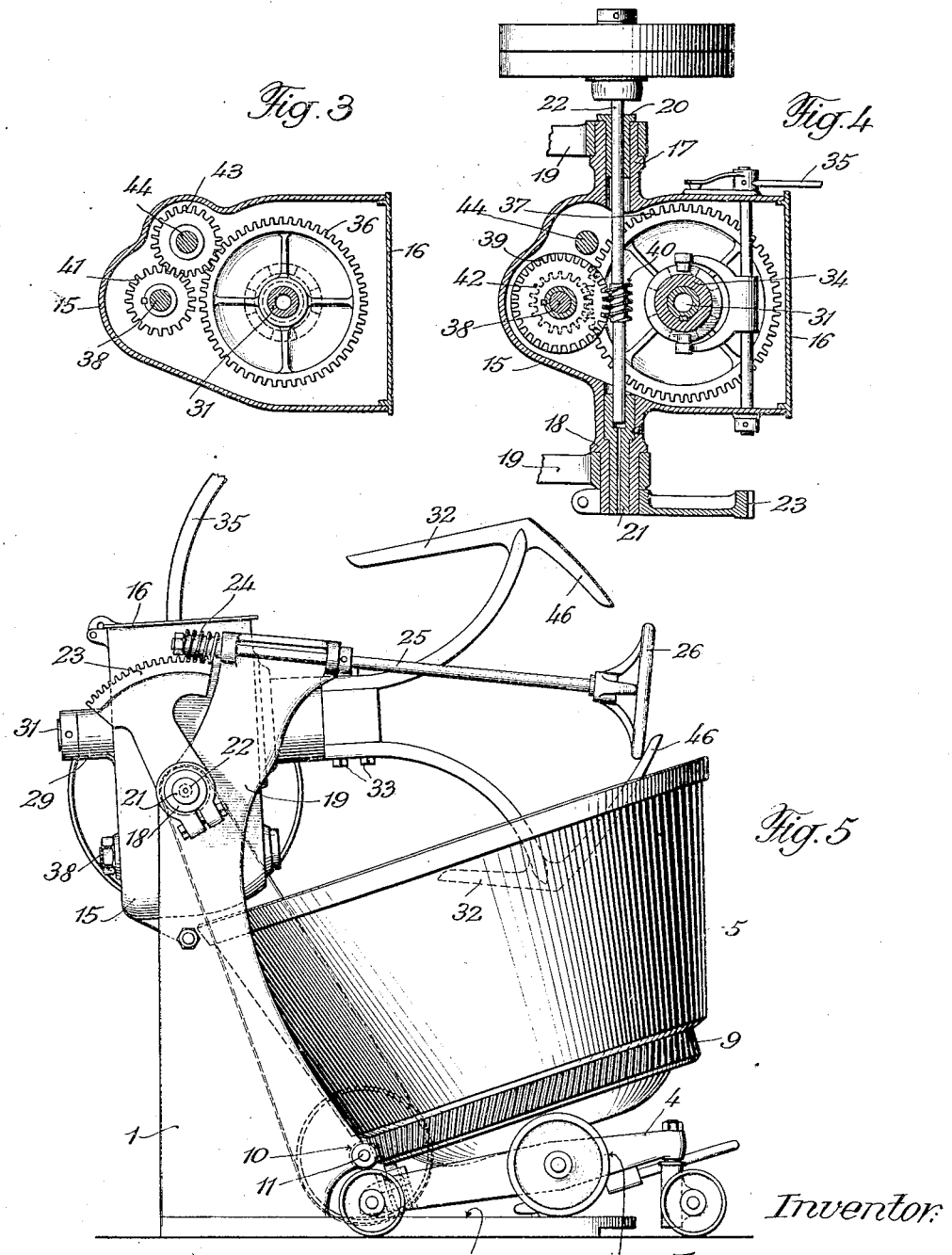
Inventor:
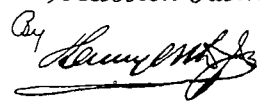
Atty.

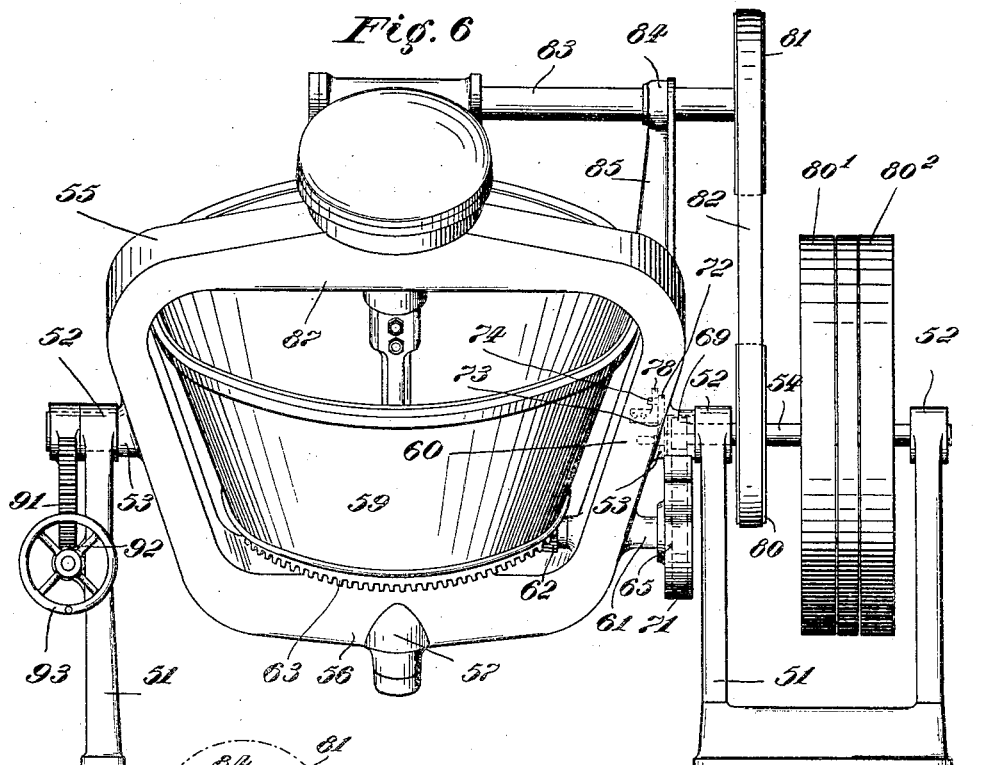
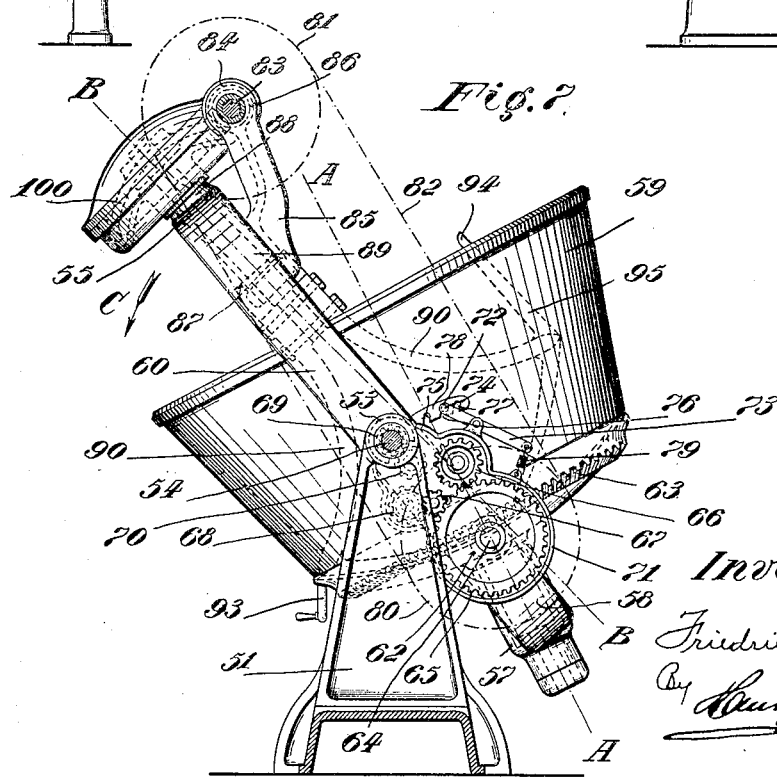

UNITED STATES PATENT OFFICE.

FRIEDRICH AESCHBACH, OF AARAU, SWITZERLAND.

MIXING AND KNEADING MACHINE.

1,336,878.  Specification of Letters Patent.  Patented Apr. 13, 1920.

Application filed April 14, 1919. Serial No. 290,022.

*To all whom it may concern:*

Be it known that I, FRIEDRICH AESCHBACH, a citizen of the Republic of Switzerland, residing at Aarau, Switzerland, have invented certain new and useful Improvements in Mixing and Kneading Machines; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in machines for kneading and mixing dough, paste and the like, comprising a movable receptacle for holding the material to be mixed and a rotary dasher adapted to be pivoted about an axis.

The kneading and mixing machines hitherto proposed are fitted with dashers of relatively small size, so that they are only adapted to mix and knead simultaneously a small portion of the whole content of the receptacle.

It has been attempted to remedy this drawback by providing the mixing and kneading machines with dashers adapted to rotate on an inclined axis. These machines comprise a vertical receptacle for holding the mass to be treated having substantially a cylindrical shape and one or more dashers. In none of these machines the axis or the axes on which the dashers rotate cut however the axis of the receptacle. In consequence of this, the range of action of the dashers of such machines is also not so great as one would like to have and the dashers cannot be so designed as to be able to touch a portion of the inner surface of the receptacle when they rotate on the inclined axis, so that they are not able to remove rapidly enough the wet flour adhering to the receptacle before it becomes hard. As a result of this, the formation of lumps of flour cannot be prevented.

The object of this invention is now to provide a mixing and kneading machine with a rotary dasher having a very great range of action and in which the dasher is adapted to remove any flour particles adhering to the inner surface of the receptacle for holding the mass to be mixed and kneaded. To this end the machine according to this invention comprises a rotatable receptacle having an inclined axis and the shape of a truncated cone and a dasher rotating on an axis cutting the inclined axis of said receptacle at an acute angle and adapted to act over an area the diameter of which corresponds to the smallest diameter of the receptacle. The profile of the dasher corresponds thereby to a portion of the inner profile of the receptacle and the arrangement is such that said dasher touches upon its rotation a portion of the inner surface of the receptacle from which it removes all adhering particles, so that any formation of lumps of flour on said surface is prevented.

A further object of this invention is to provide means permitting an easy and rapid charging and discharging of the receptacle holding the mass to be treated.

The invention further consists in the peculiar construction, arrangement and combination of parts, as hereinafter claimed and described.

This invention will now be more particularly described with reference to the accompanying drawings illustrating by way of example two modes of carrying out the invention. In these drawings:

Fig. 3 is a section on the line III—III of Fig. 1 and

Fig. 4 is a section on the line IV—IV of Fig. 1.

Fig. 5 is a side view corresponding to Fig. 1.

Fig. 6 is a front view and

Figure 1:
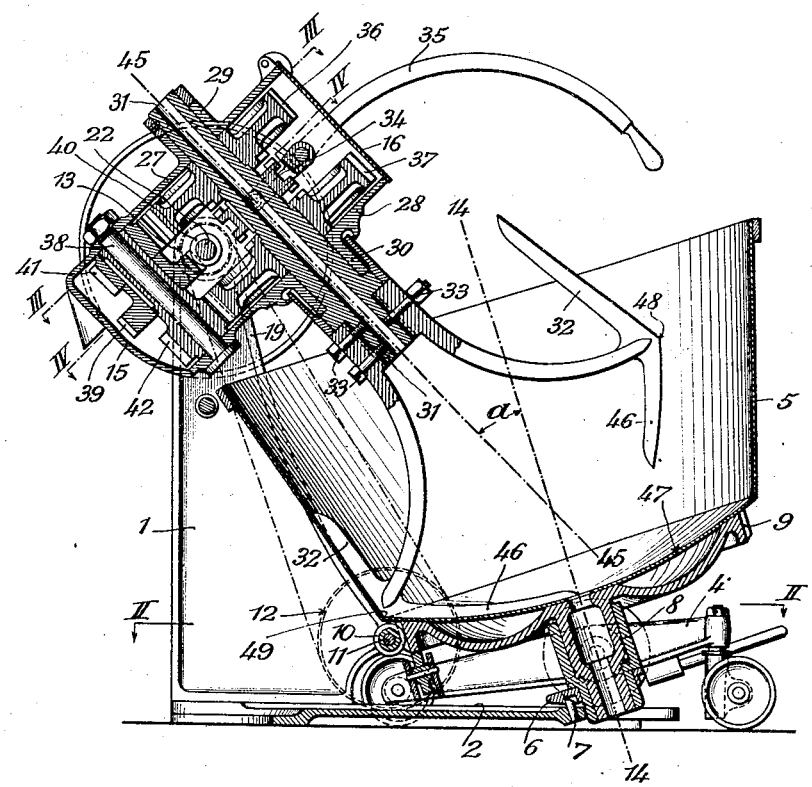
Figure 1 is a vertical section through a first embodiment of a mixing and kneading machine.
Figure 2:
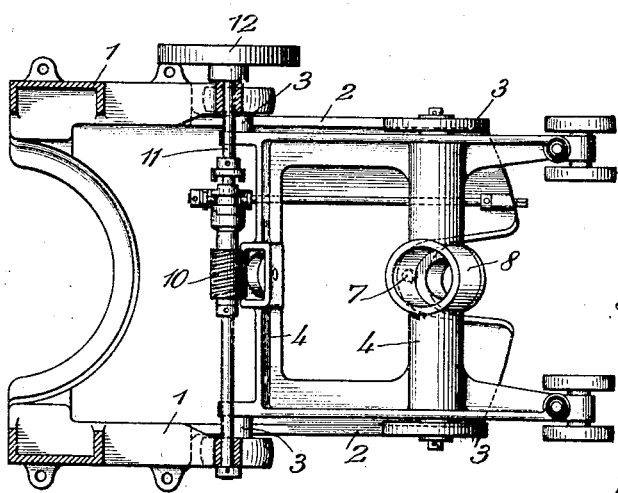
Fig. 2 is a section on the line II—II of Fig. 1.

Fig. 7 a corresponding side view of a second embodiment of the invention.

Referring at first to Figs. 1–5 of the drawings, 1 denotes the frame of the machine provided on each side with a guide rail 2 for the wheels 3 of a carriage frame 4 of the movable receptacle 5. When the wheels 3 are moved onto said rails 2, the latter act as a support for the receptacle 5 holding the material to be mixed and kneaded and adapted to rotate on the inclined axis 14—14. 6 denotes a bolt adapted to engage a pawl 7 fixed to the frame 1 of the machine in order to prevent the carriage frame 4 from any further movement when it has been brought into the proper working position. The receptacle 5 has in the embodiment shown for instance the shape of a truncated cone and it is rotatably mounted in the bearing 8 of the carriage frame 4. The receptacle 5 has a rim of teeth 9 engaging with a worm 10 which is fixed to a shaft 11 carrying a pulley 12. The latter receives its motion from a pulley 13 fixed to the main driving shaft 22. The arrangement is such that the receptacle 5 is caused to rotate always in the same direction on the axis 14—14.

15 designates a casing provided on the frame 1 of the machine and adapted to receive the driving mechanism for the mixing or kneading wing or dasher. The arrangement of said casing 15 provided with a removable cover 16 on the frame 1 is such that it is adapted to be swung together with the driving mechanism and the dasher in two directions about the axis of the main driving shaft 22, so that the dasher can be lifted and then again lowered when the carriage frame 4 together with the receptacle 5 has to be moved onto or down the rails 2. To this end the casing 15 comprises two hub-like projecting portions 17 and 18 (Fig. 4) rotatably mounted in the arms 19 of the frame 1. In each of said extensions 17 and 18 is mounted a sleeve 20 and 21 respectively; these sleeves 20, 21 act as bearings for the main driving shaft 22. To the projecting portion 18 is fixed a toothed sector 23 engaging with a worm 24 mounted on a shaft 25 carried by the frame 1 and adapted to be rotated by hand by means of the wheel 26 fixed to it.

The top end 27 of the receptacle 15 is provided with a hub-like extension 29 and the bottom end 28 with a hub-like extension 30 respectively. These extensions 29, 30 are provided for the driving shaft 31 of the dasher. To this shaft 31 is keyed a clutch member 34 adapted to be moved in the longitudinal direction of said shaft 31 by means of a pivotally mounted lever 35. On each side of the sleeve like member 34 is mounted loose on the shaft 31 a toothed wheel 36 and 37 respectively provided with coupling claws which are adapted to be brought into mesh with corresponding claws of the clutch member 34.

The end walls 27 and 28 of the casing 15 support a journal 38 on which are loosely mounted three toothed wheels rigidly connected together. One of these wheels, i. e. the wheel 39 having the shape of a worm wheel meshes with a worm 40 mounted on the main driving shaft 22, while the remaining two wheels 41 and 42 coöperate with the toothed wheels 36 and 37 respectively loose on the shaft 31, the wheel 42 meshing directly with the toothed wheel 37 and the wheel 41 meshing with the wheel 43 which meshes in its turn with the wheel 36. The wheel 43 is loose on a bolt 44 (Figs. 3 and 4) secured to the end walls 27 and 28 of the casing 15. The toothed wheels 41 and 42 have approximately the same diameter, while the wheel 37 is larger than the wheel 36.

The axis 45—45 of the driving shaft 31 of the dasher cuts the axis 14—14 of the receptacle and it incloses in its working position together with said axis 14—14 an acute angle $a$ which as a rule does not exceed 40°.

The mixing and kneading wing or dasher comprises two arms 32 fixed to its driving shaft 31 by means of bolts 33. Each of these arms 32 is provided with an extension 46. As shown in Fig. 1, the shape of the arms 32 is adapted to the inclined wall of the receptacle 5 and the shape of the extensions 46 to that of the concave bottom 47 of the receptacle 5, so that in the position of the parts shown in Fig. 1 corresponding to their working position, the revolving arms 32 as well as the extensions 46 of the dasher come to lie snugly against a portion of the lateral wall and a portion of the bottom 47 respectively of the receptacle 5. The shape, i. e. the position of the arms 32 relatively to the axis 45—45 of the dasher depends on the angle $a$ and on the slant of the conical receptacle 5. The range of action of the dasher is determined by the distance of the point 48, at which an arm 32 and an extension 46 of the latter meet from the inclined axis 45—45. In the construction illustrated in Figs. 1-5 the greatest diameter of the dasher corresponds to the smallest diameter of the receptacle 5. The dasher has therefore at the lowermost point 49 of the smallest diameter of the receptacle 5 the greatest range of action.

The working and operation of the described improved mixing and kneading machine is as follows:

When the main driving shaft 22 rotates in a certain direction, the toothed wheels 41 and 42 are caused to rotate for instance in a clockwise direction. During the first period of the kneading operation, i. e. when the dough has to be mixed, the dasher must rotate at a high speed and in the same direction as the receptacle 5 in order to subject the mass contained in the latter to a strong squeezing and jamming action. To this end the clutch member 34 is caused to engage the toothed wheel 36 so that the dasher rotates at a certain speed in a clockwise direction. The receptacle 5 rotates in the same direction. Owing to the peculiar arrangement of the axes 14—14 and 45—45 with regard to one another and to the peculiar shape of the parts 32 and 46 of the dasher, the latter does not act only on single, relatively small portions of the mass contained in the receptacle 5 but acts upon the greatest portion of the mass on both sides of the axis 14—14, the quantity of the mass subjected to the mixing and kneading action being consequently much greater and the mixing being also much more intimate than in any machine of this kind hitherto proposed. Owing to the revolving movement of the dasher on the inclined axis 45—45, the kneading mass is also continually lifted and lowered, so that a mixing of the higher layers of the mass with the lower ones is also attained. The most intensive kneading or mixing action is obtained when the dasher approaches the lateral wall and the bottom 47 of the receptacle 5 and chiefly in its lowermost position where it touches a portion of the lateral wall and of the bottom 47 of the receptacle. The reason why a dasher having a relatively great diameter corresponding approximately to the diameter of the bottom 47 of the receptacle can be used in a machine according to this invention, is a consequence of the peculiar arrangement of the axes 14—14 and 45—45 inclosing an acute angle and cutting one another and to the conical shape of the truncated receptacle 5.

During the second period of the kneading operation, i. e. when the dough has to be beaten and subjected to the final treatment, in which case the dough must be slowly drawn out and subjected to an aerating action, the clutch member 34 is brought into engagement with the toothed wheel 37. In this case the dasher is rotated in an anti-clockwise direction at a small velocity, so that the dasher and the receptacle are now rotated in opposite direction.

Referring to the second embodiment of the invention illustrated in Figs. 6 and 7, 51 denotes the frame of the machine provided with two bearings 52 for two horizontal journals 53. The latter are formed integral with the stirrup or frame 55 closed on all sides and provided with a horizontal portion 56. The latter has in its middle a footstep-bearing 57 for the journal 58 of the receptacle 59 adapted to take up the mass to be treated. 61 designates a bearing provided in the lower portion of one of the lateral sides 60 of the stirrup 55 and adapted to receive a shaft 64. To the latter is fixed a bevel wheel 62 meshing with the toothed rim 63 of the receptacle 59. The latter is arranged within the stirrup 55. To the shaft 64 is fixed a toothed wheel 65 and it carries also a pivotally mounted casing 71 adapted to receive the toothed gear 66, 67, 68 of which the toothed wheel 66 meshes with the toothed wheel 65. One of the bearings 52 supports a rotatable shaft 54 carrying a small toothed wheel 69 meshing with a toothed wheel 70 mounted in the casing 71. The arrangement is such that when an oscillating movement is imparted to the cas-
ing 71, either the larger toothed wheel 66 or the smaller wheel 68 respectively is caused to engage with the toothed wheel 70. To this end a double armed lever 72, 73 is pivotally connected to the casing 71. The arm 72 of this lever carries a pin 74 adapted to be brought into engagement with any one of three notches 75, 76, 77 provided in a stationary member 78. The pin 74 can be secured in the proper position within one of said notches by means of a strong tension spring 79 acting upon the second arm 73. The second end of the spring 79 is secured to the casing 71.

The shaft 54 carries besides a loose pulley $80^1$ and a fast pulley $80^2$ a pulley 80 illustrated in Fig. 7 in point and dash lines and operatively connected to a pulley 81 mounted on a shaft 83 by means of a belt 82. The shaft 83 rests in a bearing 84 rigidly connected to the stirrup 55 by means of a bracket 85. To one end of the shaft 83 is fixed a worm 86 (Fig. 7).

The upper horizontal portion 87 of the stirrup 55 is fitted with a bearing 88 for the driving shaft 89 carrying the kneading and mixing wing or dasher 90. To said shaft is fixed a worm wheel 100 engaging with the worm 86.

The bearings 57 and 88 are so arranged that the axis A—A about which the receptacle 59 is adapted to rotate and the axis B—B of the shaft 89 are lying in a vertical plane and cut one another within the receptacle 59 at an acute angle, while the common axis of the journals 53 forms a right angle with said vertical plane.

To an extension of one of the journals 53 is fixed a toothed segment 91 meshing with a worm 92 adapted to be rotated by means of a hand wheel 93. The shapes of the dasher 90 and of the receptacle 59 correspond to those of the corresponding parts of the first described construction.

When the receptacle 59 of the machine illustrated in Figs. 6 and 7 has to be charged or discharged the stirrup 55 together with the system carried by it, i. e. the receptacle 59, the dasher 90 and the driving members mounted on the stirrup, is turned by means of the hand wheel 93 to the required amount about the horizontal axis of the journals 53 (i. e. in the direction of the arrow C of Fig. 7). When the receptacle 59 has been charged or discharged the whole system is turned back into the working position, i. e. into the position illustrated in Figs. 6 and 7. In order to beat or subject the dough used for bread making to a final treatment, the receptacle 59 is turned for instance somewhat more downward in the direction of the arrow C than is the case when the dough has to be mixed or kneaded, so that the height up to which the dough is lifted by the ends 94 of the dasher arms 95 beyond the level of the kneading is then somewhat increased.

By inserting the pin 74 into the notch 75 a rotary movement in a certain direction will be transmitted by the wheels 70, 66, 65 to the receptacle 59, while upon an insertion of the pin 74 into the notch 77 the direction of rotation of the receptacle will be reversed. In one case the direction of rotation of the dasher arms 90 corresponds to that of the receptacle 59, while in the second case the parts 90 and 59 rotate in opposite direction, the action upon the mass to be treated being then greater.

The construction illustrated in Figs. 6 and 7 presents the advantage that the receptacle 59 and dasher arranged at a fixed angle with regard to one another can be pivoted together about a horizontal axis and brought into any desired inclined position in order to facilitate the charging and discharging of the receptacle 59. Compared with mixing and kneading machines provided with receptacles adapted to be moved on rails, the arrangement shown in Figs. 6 and 7 offers the further advantages that no lifting and lowering of the dasher has to be effected when the receptacle is moved into or out of the working position, that guide-tracks or the like and any special means for lifting or tilting the receptacle in order that it may be charged or discharged can be dispensed with.

What I claim now as my invention is:

1. In a mixing and kneading machine, an inclined receptacle whose side walls and bottom are at an obtuse angle to one another, a revoluble kneading and mixing dasher conforming to said angle, and the axis of revolution of the dasher and receptacle intersecting each other at an angle not exceeding 40°.

2. In a mixing and kneading machine, a receptacle member and a rotatable mixing and kneading dasher member whose axis of rotation is inclined to and intersects the axis of the receptacle member, separate means for rotating each member, and mechanism for reversing the direction of rotation of one of said members.

3. In a mixing and kneading machine, a receptacle member and a rotatable mixing and kneading dasher member whose axis of rotation is inclined to and intersects the axis of the receptacle member, separate means for rotating each member, and mechanism for reversing the direction of rotation of one of said members at a greater speed.

4. In a mixing and kneading machine, a receptacle and a rotatable mixing and kneading dasher coöperating with said receptacle, means to maintain the axes of rotation of the receptacle and dasher in fixed intersecting relation, mechanism for rotating the dasher, mechanism for rotating said receptacle, power means common to said mechanisms, and means to incline the receptacle and dasher as a unit at any desired angle.

5. In a mixing and kneading machine, a rotatable receptacle and a rotatable mixing and kneading dasher coöperating with said receptacle, the axes of rotation of said dasher and receptacle intersecting at a fixed angle, and means to rotate the dasher and receptacle as a unit about an axis perpendicular to the plane of said intersecting axes.

6. In a mixing and kneading machine, a closed stirrup or frame, a receptacle mounted in said frame, a mixing and kneading dasher also rotatably mounted in the frame, the axes of rotation of said dasher and receptacle intersecting and lying in a vertical plane, means to pivot the frame at right angles to said plane and means to tilt the frame.

7. In a mixing and kneading machine, a rotatable receptacle member, a rotatable mixing and kneading dasher member whose axis of rotation intersects that of the receptacle member, a reversing driving mechanism for one of said members, the inclination within limits of the latter member causing a disconnection and subsequent reversal of the driving mechanism and vice versa.

8. In a mixing and kneading machine, a rotatable receptacle member, a rotatable mixing and kneading dasher member whose axis of rotation intersects that of the receptacle member, a reversing driving mechanism for one of said members, the inclination within limits of the latter member causing a disconnection and subsequent reversal of the driving mechanism and vice versa, and independent mechanism to tilt both members as a unit.

In testimony that I claim the foregoing as my invention, I have signed my name.

FRIEDRICH AESCHBACH.